United States Patent
Saddik

(10) Patent No.: US 10,214,788 B2
(45) Date of Patent: Feb. 26, 2019

(54) COMPOSITE IRON PELLETS

(71) Applicant: Saudi Basic Industries Corporation, Riyadh (SA)

(72) Inventor: Mohamed Bahgat Saddik, Jubail (SA)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 149 days.

(21) Appl. No.: 15/112,820

(22) PCT Filed: Jan. 28, 2015

(86) PCT No.: PCT/IB2015/050662
§ 371 (c)(1),
(2) Date: Jul. 20, 2016

(87) PCT Pub. No.: WO2015/114546
PCT Pub. Date: Aug. 6, 2015

(65) Prior Publication Data
US 2016/0340751 A1    Nov. 24, 2016

Related U.S. Application Data

(60) Provisional application No. 61/934,555, filed on Jan. 31, 2014.

(51) Int. Cl.
  C22B 1/24      (2006.01)
  C22B 1/245     (2006.01)
  C21B 13/02     (2006.01)
  C21B 13/00     (2006.01)

(52) U.S. Cl.
  CPC .......... *C21B 13/02* (2013.01); *C21B 13/0046* (2013.01); *C21B 13/0073* (2013.01); *C22B 1/245* (2013.01); *C22B 1/2406* (2013.01); Y02P 10/136 (2015.11)

(58) Field of Classification Search
  CPC . C21B 13/0046; C21B 13/0073; C21B 13/02; C22B 1/2406; C22B 1/245
  See application file for complete search history.

(56) References Cited

U.S. PATENT DOCUMENTS

| | | | |
|---|---|---|---|
| 4,504,306 A | 3/1985 | Miyashita et al. | 75/756 |
| 7,938,883 B2 | 5/2011 | Negami et al. | 75/484 |

FOREIGN PATENT DOCUMENTS

| | | | |
|---|---|---|---|
| CN | 1071957 | | 5/1993 |
| JP | 57-104610 | * | 6/1982 |
| JP | S60131930 | | 7/1985 |
| JP | 2008-214715 | * | 9/2008 |
| JP | 2008214715 | | 9/2008 |

OTHER PUBLICATIONS

Misra et al, "Development of Firing Scedule to Prepare Composite Pre-reduced (CPR) Pellets", ISIJ International, vol. 34, No. 6, 1994, pp. 468-475.*
Pandey et al, "Reducinh agents and double-layered iron ore pellets", Int. J. Miner. Process, 59, 2000, pp. 295-304.*
Agrawal et al, "Cold bonded ore-coal composite pellets for sponge ironmaking Part I Laboratory scale development", Ironmaking % Steelmaking, 27:6, 2000, pp. 421-425.*
Translation for JP 2008-214715, Sep. 18, 2008.*
Misra et al., "Development of Firing Schedule to Prepare Composite Pre-reduced (CPR) Pellets", *ISIJ International* 34(6):468-475, 1994.
Pandey et al., "Reducing agents and double-layered iron ore pellets", *International Journal of Mineral Processing* 59(4):295-304, 2000.
International Search Report and Written Opinion for PCT/IB2015/050662, dated Jul. 8, 2015.
"Strong non-sintered iron ore pellets of high gas permeability—comprising a core of carbon opt. with ore powder, encased in shell of ore powder and opt. additives", Derwent, XP002285674, 1977. (English Abstract provided).
Agrawal et al., "Cold bonded ore-coal composite pellets for sponge ironmaking Part 2 Plant trials in rotary kiln", *Ironmaking & Steelmaking* 28(1):23-26, 2001.
Agrawal et al., "Cold bonded ore-coal composite pellets for sponge ironmaking Part 1 Laboratory scale development", *Ironmaking & Steelmaking* 27(6):421-425, 2000.
Prakash, "Reduction and sintering of fluxed iron ore pellets—a comprehensive review", *The Journal of the South African Institute of Mining and Metallurgy*, Jan./Feb. 1996, pp. 3-16.
Office Action issued in Chinese Application No. 20150008320.9, dated Aug. 18, 2017 (English Translation).
Schmaler, "Direct Reduced Iron—Technology and Economy of Production and Application", *The Daye Steel Plant Science and Technology Association of Zhejiang*, 1985, pp. 30-32.
Office Action issued in European Patent Application No. 15704594.9, dated Apr. 24, 2018.
Ross et al., "Chapter 19: Agglomeration iron-ore materials and their behavior during reduction," Agglomeration 77 proceedings of the 2nd International Symposium Agglomeration Atlanta, GA., Mar. 6-10, 1997, vol. 1, pp. 336-355.
Yang et al., "Metallurgical gas and steel new process," *Shanghai Science and Technical Literature Press*, 2013, p. 292.

* cited by examiner

Primary Examiner — C Melissa Koslow
(74) *Attorney, Agent, or Firm* — Norton Rose Fulbright US LLP

(57) ABSTRACT

Disclosed herein are methods and compositions for producing composite iron pellets comprising an inner core comprising iron ore and a reducing agent comprising a carbonaceous material; and an outer shell comprising unreduced iron ore. The resulting composite iron pellets can be used to produce direct reduced iron (DRI) with improved productivity while reducing gas consumption.

11 Claims, No Drawings

COMPOSITE IRON PELLETS

CROSS-REFERENCE TO RELATED APPLICATIONS

This application is a national phase application under 35 U.S.C. § 371 of International Application No. PCT/IB2015/050662 filed Jan. 28, 2015, which claims the benefit of and priority to U.S. Application No. 61/934,555 filed Jan. 31, 2014. The entire contents of each of the above-referenced disclosures are specifically incorporated herein by reference without disclaimer.

FIELD OF INVENTION

The present invention relates to composite iron pellets having a core and shell structure for use in direct reduced iron (DRI) production.

BACKGROUND OF THE INVENTION

In the ironmaking & steelmaking industry, the current high consumption rate of natural gas and the expected future unavailability of more supporting gas has led to a greater focus on alternative reducing agent as partial replacement for natural gas. While solid carbon materials have been considered to be one suitable solution, their utilization and integration into steelmaking and iron making processes are continuing to be developed and examined.

Accordingly, there remains a need for ironmaking methods and materials that can provide natural gas consumption savings, while maintaining or increasing productivity. This need and other needs are satisfied by the various aspects of the present disclosure.

SUMMARY OF THE INVENTION

In accordance with the purposes of the invention, as embodied and broadly described herein, the invention provides a composite iron pellet having a core and shell structure, the pellet comprising: a) an inner core comprising: i) iron ore; and ii) a reducing agent comprising a carbonaceous material; b) an outer shell comprising unreduced iron ore.

In a still further exemplary aspect, the invention relates to a method for producing a composite iron pellet, the method comprising the steps of: a) forming a mixture comprising iron ore and at least one reducing agent comprising a carbonaceous material; b) producing a shaped composite iron pellet; and c) drying the shaped composite iron pellet.

In further aspects, the invention also relates to articles comprising the disclosed composite iron pellets and direct reduced iron made using the disclosed composite iron pellets and methods.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a carbonaceous material" includes mixtures of two or more carbonaceous materials.

As used herein, the term "combination" is inclusive of blends, mixtures, alloys, reaction products, and the like.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent ("wt %") of a component, unless specifically stated to the contrary, is based on the total weight of the formulation or composition in which the component is included. For example if a particular element or component in a composition or article is said to have 8% by weight, it is understood that this percentage is relative to a total compositional percentage of 100% by weight.

As used herein, the term or phrase "effective," "effective amount," or "conditions effective to" refers to such amount or condition that is capable of performing the function or property for which an effective amount is expressed. As will be pointed out below, the exact amount or particular condition required will vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Composite Iron Pellet

As briefly described above, the present disclosure relates, in one aspect, to a composite iron pellet. In one aspect, the composite iron pellet comprises an inner core and an outer shell. In a further aspect, the composite iron pellet comprises a) an inner core comprising iron ore, and a reducing agent comprising a carbonaceous material; and b) an outer shell comprising unreduced iron ore comprising unreduced iron ore. In various further aspects, the composite iron pellet comprises iron, iron oxide, silicon oxide, calcium oxide, magnesium oxide, aluminum oxide, carbon, and sulfur.

In various aspects, the composite iron pellet can have any desired shape. In one aspect, the composite iron pellet is in the shape of a sphere, a ball, rod, irregular shape, or briquettes, or a combination thereof. In other aspects, the inner core comprises a carbonaceous material. In yet further aspects, the carbonaceous material is coal, coke, petroleum coke, char, or charcoal, or a combination thereof.

In a further aspect, the iron oxide comprises hematite ($Fe_2O_3$; iron (III) oxide), magnetite ($Fe_3O_4$; triiron tetroxide), limonite (FeO(OH).n($H_2O$); hydrated iron (III) oxide hydroxide), siderite ($FeCO_3$; iron (II) carbonate), iron pyrite ($FeS_2$; iron (II) disulfide), goethite (FeO(OH); iron (III) hydroxide), or combinations thereof.

In one aspect, the composite iron pellet comprises iron oxide ($Fe_2O_3$) in an amount ranging from greater than 88% by weight to 99% by weight, based on the total weight of the composite iron pellet, including exemplary values 89% by weight, 90% by weight, 91% by weight, 92% by weight, 93% by weight, 94% by weight, 95% by weight, 96% by weight, 97% by weight, and 98% by weight. In still further aspects, the composite iron pellet can comprise iron oxide in a range derived from any two of the above listed exemplary values.

In one aspect, the composite iron pellet comprises silicon oxide in an amount ranging from greater than 0% by weight to 3% by weight, based on the total weight of the composite iron pellet, including exemplary values of 0.5% by weight, 0.8% by weight, 1.0% by weight, 1.2% by weight, 1.5% by weight, 1.8% by weight, 2.0% by weight, 2.3% by weight, 2.5% by weight, and 2.8% by weight. In still further aspects, the composite iron pellet can comprise silicon oxide in a range derived from any two of the above listed exemplary values.

In one aspect, the composite iron pellet comprises calcium oxide in an amount ranging from greater than 0% by weight to 2% by weight, based on the total weight of the composite iron pellet, including exemplary values of 0.1% by weight, 0.2% by weight, 0.3% by weight, 0.5% by weight, 0.7% by weight, 0.8% by weight, 0.9% by weight, 1.0% by weight, 1.2% by weight, 1.5% by weight, 1.8% by weight, and 1.9% by weight. In still further aspects, the composite iron pellet can comprise calcium oxide in a range derived from any two of the above listed exemplary values.

In one aspect, the composite iron pellet comprises magnesium oxide in an amount ranging from greater than 0% by weight to about 1% by weight, based on the total weight of the composite iron pellet, including exemplary values of 0.1% by weight, 0.2% by weight, 0.3% by weight, 0.4% by weight. 0.5% by weight, 0.6% by weight, 0.7% by weight, 0.8% by weight, and 0.9% by weight. In still further aspects, the composite iron pellet can comprise a range derived from any two of the above listed exemplary values.

In one aspect, the composite iron pellet comprises aluminum oxide in an amount ranging from greater than 0% by weight to 1% by weight, based on the total weight of the composite iron pellet, including exemplary values of 0.1% by weight, 0.2% by weight, 0.3% by weight, 0.4% by weight. 0.5% by weight, 0.6% by weight, 0.7% by weight, 0.8% by weight, and 0.9% by weight. In still further aspects, the composite iron pellet can comprise a range derived from any two of the above listed exemplary values.

In one aspect, the composite iron pellet comprises carbon in an amount ranging from greater than 0% by weight to 12% by weight, based on the total weight of the composite iron pellet, including exemplary values of 0.1% by weight, 0.3% by weight, 0.4% by weight. 1.0% by weight, 1.6% by weight, 2.0% by weight, 2.5% by weight, and 3.0% by weight, 3.5% by weight, 4.0% by weight, 4.5% by weight, 5.0% by weight, 5.5% by weight, 6.0% by weight, 6.5% by weight, 7.0% by weight, 7.5% by weight, 8.0% by weight, 8.5% by weight, 9.0% by weight, 9.5% by weight, 10.0% by weight, 10.5% by weight, 11.0% by weight, and 11.5% by weight. In still further aspects, the composite iron pellet can comprise a range derived from any two of the above listed exemplary values.

In one aspect, the composite iron pellet comprises sulfur in an amount ranging from greater than 0% by weight to 0.1% by weight, based on the total weight of the composite iron pellet.

In one aspect, the inner core comprises iron oxide ($Fe_2O_3$) in an amount ranging from 88.0% by weight to 97% by weight, based on the total weight of the inner core, including exemplary values of 89% by weight, 90% by weight, 91% by weight, 92% by weight, 93% by weight, 94% by weight, 95% by weight, and 96% by weight. In still further aspects, the inner core can comprise iron oxide in a range derived from any two of the above listed exemplary values. In still further aspects, the inner core can comprise iron in a range derived from any two of the above listed exemplary values. For example, the inner core can comprise iron oxide in an amount ranging from 88% by weight to 96.0% by weight, based on the total weight of the inner core. In still another aspect, the inner core comprises iron oxide in an amount ranging from 88% by weight to 92% by weight, based on the total weight of the inner core.

In one aspect, the inner core comprises silicon oxide in an amount ranging from greater than 0% by weight to 3% by weight, based on the total weight of the inner core, including exemplary values of 0.5% by weight, 0.8% by weight, 1.0% by weight, 1.2% by weight, 1.5% by weight, 1.8% by weight, 2.0% by weight, 2.3% by weight, 2.5% by weight, and 2.8% by weight. In still further aspects, the inner core can comprise silicon oxide in a range derived from any two of the above listed exemplary values.

In one aspect, the inner core comprises calcium oxide in an amount ranging from greater than 0% by weight to 2% by weight, based on the total weight of the inner core, including exemplary values of 0.1% by weight, 0.2% by weight, 0.3% by weight, 0.5% by weight, 0.7% by weight, 0.8% by weight, 0.9% by weight, 1.0% by weight, 1.2% by weight, 1.5% by weight, 1.8% by weight, and 1.9% by weight. In still further aspects, the inner core can comprise calcium oxide in a range derived from any two of the above listed exemplary values.

In one aspect, the inner core comprises magnesium oxide in an amount ranging from greater than 0% by weight to about 1% by weight, based on the total weight of the inner core, including exemplary values of 0.1% by weight, 0.2% by weight, 0.3% by weight, 0.4% by weight. 0.5% by weight, 0.6% by weight, 0.7% by weight, 0.8% by weight, and 0.9% by weight. In still further aspects, the inner core can comprise magnesium oxide in a range derived from any two of the above listed exemplary values.

In one aspect, the inner core comprises aluminum oxide in an amount ranging from greater than 0% by weight to 1% by weight, based on the total weight of the inner core, including exemplary values 0.1% by weight, 0.2% by weight, 0.3% by weight, 0.4% by weight. 0.5% by weight, 0.6% by weight, 0.7% by weight, 0.8% by weight, and 0.9% by weight. In still further aspects, the inner core can comprise aluminum oxide in a range derived from any two of the above listed exemplary values.

In one aspect, the inner core comprises carbon in an amount ranging from greater than 0% by weight to 12% by weight, based on the total weight of the inner core, including exemplary values 0.1% by weight, 0.3% by weight, 0.4% by weight. 1.0% by weight, 1.6% by weight, 2.0% by weight, 2.5% by weight, and 3.0% by weight, 3.5% by weight, 4.0% by weight, 4.5% by weight, 5.0% by weight, 5.5% by weight, 6.0% by weight, 6.5% by weight, 7.0% by weight, 7.5% by weight, 8.0% by weight, 8.5% by weight, 9.0% by weight, 9.5% by weight, 10.0% by weight, 10.5% by weight, 11.0% by weight, and 11.5% by weight. In still further aspects, the inner core can comprise carbon in a range derived from any two of the above listed exemplary values.

In one aspect, the inner core comprises sulfur in an amount ranging from greater than 0% by weight to 0.1% by weight, based on the total weight of the inner core.

In one aspect, the outer shell comprises iron oxide in an amount ranging from greater than 88% by weight to 97% by weight, based on the total weight of the outer shell, including exemplary values 89% by weight, 90% by weight, 91% by weight, 92% by weight, 93% by weight, 94% by weight, 95% by weight, and 96% by weight. In still further aspects, the outer shell can comprise iron oxide in a range derived from any two of the above listed exemplary values. In still further aspects, the outer shell can comprise iron in a range derived from any two of the above listed exemplary values. For example, the outer shell can comprise iron oxide in an amount ranging from 94% by weight to 97% by weight, based on the total weight of the outer shell. In still another aspect, the outer shell comprises iron oxide in an amount ranging from 95% by weight to 97% by weight, based on the total weight of the outer shell.

In one aspect, the outer shell comprises silicon oxide in an amount ranging from greater than 0% by weight to 3% by weight, based on the total weight of the outer shell, including exemplary values of 0.5% by weight, 0.8% by weight, 1.0% by weight, 1.2% by weight, 1.5% by weight, 1.8% by weight, 2.0% by weight, 2.3% by weight, 2.5% by weight, and 2.8% by weight. In still further aspects, the outer shell can comprise silicon oxide in a range derived from any two of the above listed exemplary values.

In one aspect, the outer shell comprises calcium oxide in an amount ranging from greater than 0% by weight to 2% by weight, based on the total weight of the outer shell, including exemplary values of 0.1% by weight, 0.2% by weight, 0.3% by weight, 0.4% by weight. 0.5% by weight, 0.6% by weight, 0.7% by weight, 0.8% by weight, and 0.9% by weight. In still further aspects, the outer shell can comprise calcium oxide in a range derived from any two of the above listed exemplary values.

In one aspect, the outer shell comprises magnesium oxide in an amount ranging from greater than 0% by weight and about 1% by weight, based on the total weight of the outer shell, including exemplary values 0.1% by weight, 0.2% by weight, 0.3% by weight, 0.4% by weight. 0.5% by weight, 0.6% by weight, 0.7% by weight, 0.8% by weight, and 0.9% by weight. In still further aspects, the outer shell can comprise magnesium oxide in a range derived from any two of the above listed exemplary values.

In one aspect, the outer shell comprises aluminum oxide in an amount ranging from greater than 0% by weight to 1% by weight, based on the total weight of the outer shell, including exemplary values 0.1% by weight, 0.2% by weight, 0.3% by weight, 0.4% by weight. 0.5% by weight, 0.6% by weight, 0.7% by weight, 0.8% by weight, and 0.9% by weight. In still further aspects, the outer shell can comprise aluminum oxide in a range derived from any two of the above listed exemplary values.

In one aspect, the outer shell does not comprise carbon. In another aspect, the outer shell comprises less than about 0.05% by weight carbon based on the total weight of the outer shell, including exemplary values of less than 0.01% by weight, 0.02% by weight, 0.03% by weight, and 0.04% by weight.

In one aspect, the outer shell comprises sulfur in an amount less than about 0.05% by weight, based on the total weight of the outer shell, including exemplary values of less than 0.01% by weight, 0.02% by weight, 0.03% by weight, and 0.04% by weight.

In various aspects, the iron ore can comprise particles having any desired particle diameter. In one aspect, the iron ore comprise particles having a diameter ranging from greater than 0 mm to 20 mm, including exemplary values of 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm and 19 mm. In a still further aspect, the particle diameter can be in a range derived from any two of the above listed exemplary values. For example, the particle diameter can range from greater than 0 mm to 14 mm, or 1 mm to 15 mm.

In one aspect, the composite iron pellet comprises a binder. In a further aspect, the binder can comprise dextrin, bentonite or molasses, or a mixture thereof. In a still further aspect, the binder is bentonite. In a yet further aspect, the binder is molasses.

In a further aspect, the binder can be present in an amount from about 1.0 wt % to about 8.0 wt %, based on the total weight of the iron composite pellet, including the exemplary values of 1.5 wt %, 2.0 wt %, 3.5 wt %, 4.0 wt %, 4.5 wt %, 5.0 wt %, 5.5 wt %, 6.0 wt %, 6.5 wt %, 7.0 wt %, and 7.5 wt %. In a still further aspect, the binder can be present in a range derived from any two of the above listed exemplary wt %. For example, the binder can be present in an amount from about 1.0 wt % to about 4.0 wt %.

In one aspect, the composite iron pellet can have any desired average pellet size. In a further aspect, the average pellet size can range from about 7 mm to 20 mm, including exemplary values of 8 mm, 9 mm, 10 mm, 11 mm, 12 mm, 13 mm, 14 mm, 15 mm, 16 mm, 17 mm, 18 mm and 19 mm. In a still further aspect, the average pellet size can be in a range derived from any two of the above listed exemplary values. For example, the average pellet size can range from 12 mm to 14 mm, or 10 mm to 15 mm.

In one aspect, the inner core can comprise from about 25% by weight to about 75% by weight based on the total weight of the pellet, including exemplary values of including exemplary values of 26% by weight, 27% by weight, 28% by weight, 29% by weight, 30% by weight, 31% by weight, 32% by weight, 33% by weight, 34% by weight, 35% by weight, 36% by weight, 37% by weight, 38% by weight, 39% by weight, 40% by weight, 41% by weight, 42% by weight, 43% by weight, 44% by weight, 45% by weight, 46% by weight, 47% by weight, 48% by weight, 49% by weight, 50% by weight, 51% by weight, 52% by weight, 53% by weight, 54% by weight, 55% by weight, 56% by weight, 57% by weight, 58% by weight, 59% by weight, 60% by weight, 61% by weight, 62% by weight, 63% by weight, 64% by weight, 65% by weight, 66% by weight, 67% by weight, 68% by weight, 69% by weight, 70% by weight, 71% by weight, 72% by weight, 73% by weight, and 74% by weight. In another aspect, the range can be derived from any two exemplary values. For example, the range can be from about 25% by weight to about 73% by weight, or about 27% by weight to about 71% by weight. In a further aspect, the outer shell can comprise from about 25% by weight to about 75% by weight based on the total weight of the pellet, including exemplary values of including exemplary values of 26% by weight, 27% by weight, 28% by weight, 29% by weight, 30% by weight, 31% by weight, 32% by weight, 33% by weight, 34% by weight, 35% by weight, 36% by weight, 37% by weight, 38% by weight, 39% by weight, 40% by weight, 41% by weight, 42% by weight, 43% by weight, 44% by weight, 45% by weight, 46% by weight, 47% by weight, 48% by weight, 49% by weight, 50% by weight, 51% by weight, 52% by weight, 53% by weight, 54% by weight, 55% by weight, 56% by weight, 57% by weight, 58% by weight, 59% by weight, 60% by weight, 61% by weight, 62% by weight, 63% by weight, 64% by weight, 65% by weight, 66% by weight, 67% by weight, 68% by weight, 69% by weight, 70% by weight, 71% by weight, 72% by weight, 73% by weight, and 74% by weight. In another aspect, the range can be derived from any two exemplary values. For example, the range can be from about 25% by weight to about 73% by weight, or about 27% by weight to about 71% by weight. In a yet further aspect, the combined weight percent value of all components does not exceed about 100% by weight; and all weight percent values are based on the total weight of the pellet. In some aspects, the inner core comprises from about 25 wt % to about 75 wt %, and the outer shell comprises from about 25 wt % to about 75 wt %; wherein the combined weight percent value of all components does not exceed about 100 wt %; and wherein all weight percent values are based on the total weight of the pellet.

In one aspect, the inner core thickness can comprise from about 25% to about 75% of the pellet's diameter, including exemplary values of including exemplary values of 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, and 74%. In another aspect, the range can be derived from any two exemplary values. For example, the range can be from about 25% to about 73%, or about 27% to about 71%. In a still further aspect, the outer shell thickness can comprise from about 25% to about 75% of the pellet's diameter, including exemplary values of including exemplary values of 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, and 74%. In another aspect, the range can be derived from any two exemplary values. For example, the range can be from about 25% to about 73%, or about 27% to about 71%. In a yet further aspect, the combined weight percent value of all components does not exceed about 100 wt %; and all weight percent values are based on the total weight of the pellet. In some aspects, the inner core thickness comprises from about 25% to about 75% of pellet's diameter, and the outer shell thickness comprises from about 25% to about 75% of pellet's diameter; wherein the combined weight percent value of all components does not exceed about 100 wt %; and wherein all weight percent values are based on the total weight of the pellet.

In various aspect, the composite iron pellet has improved properties in physical, mechanical, chemical, and metallurgical properties.

In addition to the foregoing components, the disclosed composite iron pellet can optionally comprise a balance amount of one or more additive materials ordinarily incorporated in composite iron compositions of this type, with the proviso that the additives are selected so as to not significantly adversely affect the desired properties of the composite iron pellet. Combinations of additives can be used. Such additives can be mixed at a suitable time during the mixing of the components for forming the composite iron pellets.

C. Methods of Making the Composite Iron Pellets

Also disclosed herein are methods of making the composite iron pellets described above. In various aspects, the composite iron pellets of the present invention can be manufactured by various methods. In one aspect, the composite iron pellets of the present invention can be blended with the aforementioned ingredients by a variety of methods involving admixing of the materials with any additional additives desired in the formulation. For example, the materials can be mixed using conventional methods such as with an intensive mixer, such as a R02 Eirich mixer or any other mixing equipment.

Because of the availability of pelletizing equipment in commercial processing facilities, various pelletizing methods can be used to shape or form the composite iron pellets. In various further aspects, the pelletizing equipment used in such processing methods includes, but is not limited to, the following: a disc pelletizer, a pan pelletizer, or a drum pelletizer, and various other types of pelletizing equipment. Methods of pelletizing are known to those of skill in the art, as described in B. Agrawal, K. Prasad, S. Sarkar and H. ray, Ironmaking & steelmaking, 2001, vol. 28, No. 1, 23, which is hereby incorporated by reference.

In one aspect, the invention provides a method for preparing a composite iron pellet, comprising: a) forming a mixture comprising iron ore and at least one reducing agent comprising a carbonaceous material; b) producing a shaped composite iron pellet; and c) drying the shaped composite iron pellet. In a further aspect, the method further comprises coating the shaped composite iron pellet with an outer shell comprising unreduced iron ore. In some aspects, the mixture of a) further comprises a binder. In other aspects, the coating further comprises a binder.

In various aspects, the iron composite pellet can be dried using conventional methods, such as, for example, in the sun for a period of 1-4 days or heating in a drying oven.

In one aspect, the composite iron pellet can be made using cold bonding. For example, the composite iron pellet bonding can be performed using the techniques described in B. Agrawal, K. Prasad, S. Sarkar and H. ray, Ironmaking & steelmaking, 2000, vol. 27, No. 6, 421, which is incorporated by reference in its entirety for its teaching of cold bonding.

In further aspects, the composite iron pellet can be made by firing. For example, the composite iron pellet firing can be performed using the techniques described in S. Prakash, The Journal of The South African Institute of Mining and Metallurgy, JANUARY/FEBRUARY, 1996, 3-16, which is incorporated by reference in its entirety for its teaching of firing.

The temperature of the firing is maintained at a temperature between about 1000° C. and about 1500° C. For example, it can be desirable to maintain the firing temperature between about 1000° C. and about 1200° C., although higher temperatures can be used provided that the residence time in the processing equipment is adjusted.

D. Methods of Using the Composite Iron Pellets

Also disclosed herein are methods of using the composite iron pellets described above. In various aspects, the composite iron pellets of the present invention can be used to produce iron by various methods. In one aspect, the composite iron pellets of the present invention can in the production of direct reduced iron (DRI). For example, the composite iron pellets can be used in DRI production using conventional methods such as, in the presence of a second reducing agent with a furnace, for example, a MIDREX furnace, or HYL III furnace, or any other DRI production equipment. For example, the composite iron pellet firing can be used in DRI production techniques described in Direct reduced iron: Technology and Economics of Production and Use, ed. by J. Feinman and D. R. Mac Rae, ISS, Warrendale, Pa., (1999), which is incorporated by reference in its entirety for its teaching of DRI production.

Direct reduction ("DR") of iron, e.g. iron oxide or iron ore, generates metallic iron in solid form, also referred to as direct reduced iron ("DRI"), by removing oxygen using a reducing gas comprising hydrogen and carbon monoxide. In some cases, the reducing gas can be provided from the synthesis gas obtained from natural gas by steam methane reforming. Alternatively, the reducing gas can be produced in situ in the reducing reactor from supplied natural gas and oxygen. The reducing process can be illustrated by the following chemical reaction, where water and carbon dioxide are obtained as reaction byproducts:

$Fe_2O_3 + H_2 \rightarrow 2Fe + 3H_2O$ $Fe_2O_3 + CO \rightarrow 2Fe + CO_2$

Iron obtained from a DR process can be cooled and carbonized, e.g. by counterflowing gases in the lower portion of a direct reduction reactor according to the following reaction:

$3Fe + CO + H_2 \rightarrow Fe_3C + H_2O$ $3Fe + CH_4 \rightarrow Fe_3C + 2H_2$ $3Fe + 2CO \rightarrow Fe_3C + CO_2$ By the foregoing chemical processes, products such as cold direct reduction iron, hot briquetted iron, and hot direct reduction iron can be manufactured.

In addition to the chemical reactions described herein above, methane reforming and water gas shift reactions can also occur in the gas phase based on the composition of the input reduction gas and operating temperatures in the reduction reaction vessel. These additional gas phase reactions include the following:

$CH_4 + 2H_2O \rightarrow CO_2 + 4H_2$ $CO_2 + H_2 \rightarrow CO + H_2O$

Thus, the gas exiting a direct reduction reactor, i.e. off-gas or top gas, comprises both unreacted gases present in the input reducing gas mixture and the gaseous reaction products illustrated in the reactions above. In addition, the input reducing gas mixture can comprise additional components such nitrogen. The top gas is a complex gaseous mixture comprising nitrogen, methane, water vapor, hydrogen, carbon dioxide, and carbon monoxide. In various DR processes, the top gas can be cleaned by scrubbing and carbon dioxide removed. For example, the top gas, following scrubbing and carbon dioxide removal, can be recycled back into the reducing gas stream and utilized for further direct reduction of iron.

In various aspects, the direct reduction process comprises a first module for reducing iron oxide comprising a first reducing gas inlet, a first reducing reactor, and a top gas outlet; wherein the first module, during operation, produces metallic iron and expels a top gas via the top gas outlet. An example of the first module for reducing iron by a direct reduction process is a production module or plant commonly using the Midrex® direct reduction process. In a further aspect, the first module for reducing iron oxide by direct reduction process utilizes a Midrex® direct reduction process and comprises a first reducing gas inlet, a first reducing reactor, and a top gas outlet, wherein the first module, during operation, produces metallic iron and expels a top gas via the top gas outlet.

In various aspects, the first module direct reduction process can be characterized by use of a low pressure reducing gas introduced to a moving bed shaft reactor where the reducing gas moves counter-current to the lump iron oxide (or alternatively, lump iron oxide pellets). In this case, the reducing gas (from about 10 mol % to about 20 mol % CO; and from about 80 mol % to about 90 mol % $H_2$) of the first module direct reduction process is typically produced from natural gas using a $CO_2$ reforming process in combination with a catalyst, e.g. Midrex reforming process with the Midrex proprietary catalyst. The first module direct reduction process is further characterized by a single reformer rather than a reformer/heater combination and by lack of a requirement to cool the reducing gas prior to introduction to the shaft reactor.

In various aspects, the first reducing reactor is a moving bed shaft reactor. Appropriate reactor designs are commercially available from Midrex Technologies, Inc. (Charlotte, N.C., US). In a further aspect, the first reducing reactor comprises a vertical cylindrical vessel containing an internal refractory insulation, wherein the iron oxide flows down by gravity and is contacted by an upward flowing reducing gas. In a still further aspect, the iron oxide is present as iron oxide pellets or lump iron ore.

In a further aspect, the first reducing gas inlet introduces to the first reducing reactor a reducing gas at a pressure from about 1 bar to about 1.5 bar at a temperature from about 800° C. to about 850° C. The reducing gas can generally be formed natural gas or other gaseous stream that can be reformed or cracked to produce $H_2$ or CO to be used in the reduction of the iron oxide. In general, high methane containing natural gas is the most common form of input gas for the formation of the reducing gas. The input gas may be a byproduct of other processes. In a still further aspect, the reducing gas mixture is formed from natural gas and water. In a yet further aspect, the reducing gas mixture comprises carbon monoxide and hydrogen.

Alternatively, the direct reduction process comprises a first module for reducing iron oxide comprising a first reducing gas inlet, a reducing reactor, a reducing gas heater, and a steam boiler; wherein the first module, during operation, produces metallic iron; and wherein the reducing reactor, during operation, produces metallic iron and operates at a pressure of at least about 5 bar. An example of the alternative first module for reducing iron by a direct reduction process is a production module or plant commonly using the HYL® direct reduction process. In a further aspect, the first module for reducing iron oxide by direct reduction process utilizes a HYL® direct reduction process comprising a reducing gas inlet, a reducing reactor, a reducing gas heater, and a steam boiler, wherein the reducing reactor, during operation, produces metallic iron; and wherein the second module, during operation, produces metallic iron and operates at a pressure of at least about 5 bar.

The alternative first module direct reduction process is characterized by use of a high pressure reducing gas introduced to a moving bed shaft reactor where the reducing gas moves counter-current to the lump iron oxide (or alternatively, lump iron oxide pellets). In this case, the reducing gas is generated by self-reforming in the second reduction reactor, with make-up gas—typically natural gas—being provided to the reducing gas circuit and injecting oxygen at the inlet of the second reducing reactor. The HYL®-type direct reduction process is further characterized by a reducing gas heater. The HYL®-type direct reduction process can optionally comprise a steam methane reforming unit.

In various aspects, the reducing reactor is a moving bed shaft reactor. Appropriate reactor designs are commercially available from Tenova HYL (Coraopolis, Pa., US). In a further aspect, the reducing reactor comprises a vertical cylindrical vessel, wherein iron oxide is introduced to the second reducing reactor via a sealing mechanism that is based upon a pressure lock system. In a still further aspect, once the iron oxide is introduced in the second reducing reactor, it flows down by gravity and is contacted by an upward flowing reducing gas. In a still further aspect, the iron oxide is present as iron oxide pellets, lump iron ore, or mixture thereof.

It is understood in the foregoing discussion that reference to iron oxide comprises the composite iron ore pellets of the present invention. Moreover, the composite iron ore pellets of the present invention can be utilized in other direct reduction processes as known to one skilled in the art.

In one aspect, the invention provides an iron oxide-reducing system comprising: a) a module for reducing iron oxide by direct reduction process, the module comprising a reducing gas inlet, a reducing reactor, and a top gas outlet; b) providing the disclosed composite iron pellet to the reducing reactor; c) carrying out direct reduction of the composite iron pellet; and d) expel the reduced iron from the reducing reactor.

E. Articles of Manufacture

In various aspects, the disclosed composite iron pellets of the present invention can be used in making articles. In a further aspect, the disclosed composite iron pellets can be formed into useful shaped articles by a variety of means such as: casting, molding, extrusion, and the like.

Optionally, in various aspects, the disclosed composite pellets can be produced on an industrial scale, and the disclosed methods can be operated or performed on an industrial scale. In one aspect, the methods disclosed herein can be configured to produce pellets on an industrial scale. For example, according to further aspects, the methods can produce batches of pellets on an industrial scale. In a further aspect, the batch size can comprise any desired industrial-scale batch size.

In one aspect, the batch size can optionally be at least about 1 kg, including exemplary batch sizes of at least about 10 kg, at least about 25 kg, at least about 50 kg, at least about 100 kg, at least about 250 kg, at least about 500 kg, at least about 750 kg, at least about 1,000 kg, at least about 2,500 kg, or greater. In an additional aspect, the batch size can optionally range from about 1 kg to about 2,500 kg, such as, for example, from about 10 kg to about 1,000 kg, from about 1,000 kg to about 2,500 kg, from about 100 kg to about 500 kg, from about 500 kg to about 1,000 kg, from about 10 kg to about 100 kg, from about 100 kg to about 250 kg, from about 500 kg to about 750 kg, or from about 750 kg to about 1,000 kg.

In another aspect, the batch size can optionally be at least about 1 ton, including exemplary batch sizes of at least about 10 tons, at least about 25 tons, at least about 50 tons, at least about 100 tons, at least about 250 tons, at least about 500 tons, at least about 750 tons, at least about 1000 tons, at least about 2,500 tons, or greater. In an additional aspect, the batch size can optionally range from about 1 ton to about 2,500 tons, such as, for example, from about 10 tons to about 1,000 tons, from about 1,000 tons to about 2,500 tons, from about 100 tons to about 500 tons, from about 500 tons to about 1,000 tons, from about 10 tons to about 100 tons, from about 100 tons to about 250 tons, from about 500 tons to about 750 tons, or from about 750 tons to about 1,000 tons.

In various aspects, the disclosed methods can be operated or performed on any desired time scale or production schedule that is commercially practicable. In one aspect, the disclosed methods can produce a quantity of at least 1 ton of pellets in a period of 1 day or less, including exemplary quantities of at least about 10 tons, 100 tons, 500 tons, or 1,000 tons, 2,500 tons, or greater within the period. In a further aspect, the period of time can be 1 hour. In a still further aspect, the quantity of pellets produced can range from about 1 ton to about 1,000 tons, and the period of time can range from about 1 hour to about 1 year, for example, about 10 to about 1,000 tons in a period of about 1 hour to about 1 day.

F. Aspects

In various aspects, the present invention pertains to and includes at least the following aspects.

Aspect 1: A composite iron pellet having a core and shell structure, the pellet comprising: (a) an inner core comprising: (i) iron ore; and (ii) a reducing agent comprising a carbonaceous material; (b) an outer shell comprising unreduced iron ore.

Aspect 2: The pellet of aspect 1, wherein the carbonaceous material is coke, pet coke, char, or charcoal, or a combination thereof.

Aspect 3: The pellet of aspects 1-2, wherein the pellets are fired.

Aspect 4: The pellet of aspects 1-3, wherein the pellets are cold bonded.

Aspect 5: The pellet of aspects 1-4, wherein the outer shell comprises iron oxide ($Fe_2O_3$).

Aspect 6: The pellet of aspects 1-5, wherein the pellets are used in direct reduced iron (DRI) production in the presence of a second reducing agent.

Aspect 7: The pellet of aspect 6, wherein the DRI production takes place in a direct reduced iron furnace.

Aspect 8: The pellet of aspect 6, wherein the second reducing agent is reformed natural gas.

Aspect 9: The pellet of aspects 1-8, wherein the inner core comprises at least 3 wt % carbon.

Aspect 10: The pellet of aspects 1-8, wherein the inner core comprises at least 5 wt % carbon.

Aspect 11: The pellet of aspects 1-8, wherein the inner core comprises from about 3 wt % to about 12 wt % carbon.

Aspect 12: The pellet of aspects 1-11, wherein the inner core comprises iron oxide ($Fe_2O_3$).

Aspect 13: The pellet of aspects 1-12, wherein the composite iron pellet further comprises a binder.

Aspect 14: The pellet of aspects 1-13, wherein the inner core comprises from about 25 wt % to about 75 wt %, and the outer shell comprises from about 25 wt % to about 75 wt %; wherein the combined weight percent value of all components does not exceed about 100 wt %; and wherein all weight percent values are based on the total weight of the pellet.

Aspect 15: The pellet of aspects 1-14, wherein the inner core thickness comprises from about 25% to about 75% of pellet's diameter, and the outer shell thickness comprises from about 25% to about 75% of pellet's diameter; wherein the combined weight percent value of all components does not exceed about 100 wt %; and wherein all weight percent values are based on the total weight of the pellet.

Aspect 16: The pellet of aspect 1, wherein the inner core comprises at least about 3 wt % carbon.

Aspect 17: The pellet of aspect 3, wherein the inner core comprises less than about 3 wt % carbon.

Aspect 18: The pellet of aspect 1, wherein the outer shell comprises at least 90 wt % $Fe_2O_3$.

Aspect 19: The pellet of aspects 1-18, wherein the composite iron pellet comprises at least 90 wt % $Fe_2O_3$.

Aspect 20: The pellet of aspects 1-19, wherein the composite iron pellet comprises from greater than 0 wt % to about 1 wt % $Al_2O_3$.

Aspect 21: The pellet of aspects 1-20, wherein the composite iron pellet comprises from greater than 0 wt % to about 3.0 wt % $SiO_2$.

Aspect 22: The pellet of aspects 1-21, wherein the composite iron pellet comprises from greater than 0 wt % to about 1.0 wt % CaO.

Aspect 23: The pellet of aspects 1-22, wherein the composite iron pellet comprises from greater than 0 wt % to about 1.0 wt % MgO.

Aspect 24: The pellet of aspects 1-23, wherein the composite iron pellet has an average pellet size of at least about 12 mm.

Aspect 25: The pellet of aspects 1-24, wherein the iron ore comprises particles having a diameter ranging from greater than 0 mm to 3 mm.

Aspect 26: A method for producing a composite iron pellet, the method comprising the steps of: (a) forming a mixture comprising iron ore and at least one reducing agent comprising a carbonaceous material; (b) producing a shaped composite iron pellet; and (c) drying the shaped composite iron pellet.

Aspect 27: The method of aspect 26, further comprising coating the composite iron pellet with an outer shell comprising unreduced iron ore.

Aspect 28: The method of aspect 26, further comprising firing the composite iron pellet.

Aspect 29: The method of aspect 27, wherein the mixture of (a) or the coating further comprises a binder.

Aspect 30: A method for producing iron, the method comprising: (a) providing the composite iron pellet of aspects 1-24; (b) charging the composite iron pellet to a furnace; and (c) reducing the composite iron pellets in the presence of reformed natural gas to thereby provide iron.

Aspect 31: The method of aspect 30, wherein the composite iron pellet is fired or cold bonded.

Aspect 32: The method of aspect 30 or 31, wherein the iron is produced cold or hot.

Without further elaboration, it is believed that one skilled in the art can, using the description herein, utilize the present invention. The following examples are included to provide addition guidance to those skilled in the art of practicing the claimed invention. The examples provided are merely representative of the work and contribute to the teaching of the present invention. Accordingly, these examples are not intended to limit the invention in any manner.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

G. Examples

The following examples are put forth so as to provide those of ordinary skill in the art with a complete disclosure and description of how the compounds, compositions, articles, devices and/or methods claimed herein can be made and can be evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or can be at ambient temperature, and pressure can be at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only routine experimentation, if any, will be required to optimize such process conditions. Several methods for preparing the pellets of this invention are illustrated in the following examples.

Example 1

In one aspect, Table 1 and Table 2 below show the typical analysis of iron ore or oxide fines that can be used to produce the composite iron pellets. In further aspects, other ingredients can include various amounts of carbon, sulfur, sodium, potassium, zinc, chlorine, fluorine, and/or water.

TABLE 1*

| Element | Oxide fines/ores |
|---|---|
| Fe-Tot | 65.7 |
| $Fe_2O_3$ | 96.6 |
| MgO | 0.8 |
| $Al_2O_3$ | 0.3 |
| $SiO_2$ | 0.8 |
| $P_2O_5$ | 0.2 |
| $SO_3$ | 0.0 |
| CaO | 0.6 |
| $TiO_2$ | 0.0 |
| $V_2O_5$ | 0.0 |
| MnO | 0.6 |
| ZnO | 0.0 |
| PbO | 0.0 |
| Others | 0.0 |
| Total | 100.0 |

*Amounts provided in terms of percent of total composition (by weight).

TABLE 2*

| Element | Oxide fines/ores | Oxide fines/ores |
|---|---|---|
| $Na_2O$ | 0.1100 | 0.0945 |
| MgO | 0.1350 | 0.4975 |
| $Al_2O_3$ | 0.3000 | 0.3915 |
| $SiO_2$ | 1.8150 | 2.8450 |
| $P_2O_5$ | 0.0710 | 0.0970 |
| $K_2O$ | 0.0082 | 0.0250 |
| CaO | 0.7810 | 0.0082 |
| $TiO_2$ | 0.0345 | 1.0700 |
| $V_2O_5$ | 0.0040 | 0.0373 |
| $Cr_2O_3$ | 0.0328 | 0.0078 |
| MnO | 0.0554 | 0.0379 |
| $Fe_2O_3$ | Balance | Balance |
| Total | 100.0 | 100.00 |

*Amounts provided in terms of percent of total composition (by weight).

In one aspect, inner core batches can be prepared by pre-blending all constituents (with or without a binder) in a dry-blend and mixed for a desired duration. The pre-blend can then be fed directly into a disc pelletizer. The inner core extrudate can then be pelletized and dried at about a suitable temperature for a suitable duration. Next, the outer shell can be prepared by pre-blending all outer shell constituents (with or without a binder) in a dry-blend and mixed for a desired duration. The outer shell pre-blend can then be applied directly to the inner core pellet using a coating or spraying device and dried at a suitable temperature for a suitable duration. In some aspects, cold-bonded pellets can be air dried. In other aspects, pellets can be fired.

In another aspect, after preparation of the inner core as described above, the outer shell (iron ore) can be applied directly to the inner core pellet using a disc pelletizer.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A composite iron pellet having a core and shell structure,
   the pellet comprising:
   (a) an inner core comprising:
      i. iron ore; and
      ii. a reducing agent comprising a carbonaceous material;
   (b) an outer shell comprising unreduced iron ore;
   wherein the composite iron pellet comprises at least 90 wt % $Fe_2O_3$, and wherein the inner core comprises from 88.0 wt % to 97 wt % $Fe_2O_3$ and from 3 wt % to 9.5 wt % of said carbonaceous material; wherein the pellets are fired.

2. The pellet of claim 1, wherein the carbonaceous material is coke, pet coke, char, or charcoal, or a combination thereof.

3. The pellet of claim 1, wherein the composite iron pellet further comprises a binder.

4. The pellet of claim 1, wherein the inner core thickness comprises from about 25% to about 75% of pellet's diameter, and the outer shell thickness comprises from about 25% to about 75% of the pellet's diameter.

5. The pellet of claim 1, wherein the composite iron pellet comprises from greater than 0 wt % to about 1 wt % $Al_2O_3$ greater than 0 wt % to about 3.0 wt % $SiO_2$, greater than 0 wt % to about 1.0 wt % CaO, or greater than 0 wt % to about 1.0 wt % MgO, or any combination thereof.

6. The pellet of claim 1, wherein the composite iron pellet has an average pellet size of at least about 12 mm.

7. The pellet of claim 1, wherein the iron ore comprises particles having a diameter ranging from greater than 0 mm to 3 mm.

8. The pellet of claim 1, wherein the outer shell comprises iron oxide in an amount ranging from greater than 88% by weight to 97% by weight, based on the total weight of the outer shell.

9. A composite iron pellet having a core and shell structure,
   the pellet comprising:
   (a) an inner core comprising:
      i. iron ore; and
      ii. a reducing agent comprising a carbonaceous material;
   (b) an outer shell comprising unreduced iron ore;
   wherein the composite iron pellet comprises at least 90 wt % $Fe_2O_3$, and
   wherein the inner core comprises from 88.0 wt % to 97 wt % $Fe_2O_3$ and from 3 wt % to 9.5 wt % of said carbonaceous material, wherein the inner core comprises from about 25 wt % to about 75 wt %, and the outer shell comprises from about 25 wt % to about 75 wt %; wherein the combined weight percent value of all components does not exceed about 100 wt %; and wherein all weight percent values are based on the total weight of the pellet.

10. A method for producing a composite iron pellet of claim 1,
    the method comprising the steps of:
    (a) forming a mixture comprising iron ore and at least one reducing agent comprising a carbonaceous material;

(b) producing a shaped composite iron pellet;
(c) drying the shaped composite iron pellet; and
(d) firing the shaped composite iron pellet.

11. A method for producing iron, the method comprising:
(a) providing the composite iron pellet of claim 1;
(b) charging the composite iron pellet to a furnace; and
(c) reducing the composite iron pellets in the presence of reformed natural gas to thereby provide iron.

\* \* \* \* \*